(12) United States Patent
Kawahara et al.

(10) Patent No.: US 9,102,390 B2
(45) Date of Patent: Aug. 11, 2015

(54) UNDERWATER RISING/FALLING DEVICE

(75) Inventors: Hisayoshi Kawahara, Kawagoe (JP);
Tetsuya Nakamura, Kawagoe (JP);
Jungo Ohta, Kawagoe (JP)

(73) Assignee: NiGK CORPORATION, Kawagoe-shi, Saitama (JP)

( * ) Notice: Subject to any disclaimer, the term of this patent is extended or adjusted under 35 U.S.C. 154(b) by 0 days.

(21) Appl. No.: 14/344,781

(22) PCT Filed: Sep. 11, 2012

(86) PCT No.: PCT/JP2012/073139
§ 371 (c)(1),
(2), (4) Date: Mar. 13, 2014

(87) PCT Pub. No.: WO2013/039048
PCT Pub. Date: Mar. 21, 2013

(65) Prior Publication Data
US 2014/0348593 A1   Nov. 27, 2014

(30) Foreign Application Priority Data
Sep. 16, 2011  (JP) ................. 2011-203274

(51) Int. Cl.
*B63C 11/52* (2006.01)
*B66D 1/60* (2006.01)
(Continued)

(52) U.S. Cl.
CPC ............... *B63C 11/52* (2013.01); *B63B 22/06* (2013.01); *B63B 22/18* (2013.01); *B66D 1/485* (2013.01); *B66D 1/525* (2013.01); *B66D 1/60* (2013.01); *G01C 21/12* (2013.01); *G01L 19/0092* (2013.01); *B63B 2205/06* (2013.01)

(58) Field of Classification Search
CPC ............ B63C 11/00; B66D 1/46; B66D 1/60
USPC .................................. 405/158, 224
See application file for complete search history.

(56) References Cited

FOREIGN PATENT DOCUMENTS

| JP | 49-116789 | 11/1974 |
|----|-----------|---------|
| JP | 63-59191  | 4/1988  |
| JP | 05-139370 | 6/1993  |
| JP | 2001-15147 A * | 6/2001 |

(Continued)

OTHER PUBLICATIONS

International Search Report of PCT/JP2012/073139, mailed Dec. 18, 2012, 2 pages.

*Primary Examiner* — Tara M. Pinnock
(74) *Attorney, Agent, or Firm* — Collard & Roe, P.C.

(57) ABSTRACT

Provided is an underwater elevating apparatus, wherein the cable is not paid out unexpectedly by self-buoyancy while waiting underwater, excessive paying out of the cable may be prevented by a latch unit having simple mechanisms, and electric power does not be used needlessly. An underwater elevating apparatus (1), which rises or descends together with a flame (10) having an underwater observation apparatus (80) and buoyancy bodies (12) connected through a cable (11) anchored to the bottom, comprises: a stopper (51) halfway attached to the cable (11) at a lower position than the frame (10); a winch provided to the frame (10) for spooling and paying out of the cable (11); and a latch unit (30) provided to the frame (10), having opening or closing a plurality of hooks surrounding the cable (11), for causing the winch to stop spooling of the cable (11) while causing the plurality of hooks closed to seize the stopper (51) on the basis of a trigger according to pressure and contact with the stopper (51) by spooling thereof, and for causing the winch to start paying out of the cable from the plurality of hooks opened on the basis of the trigger by release of the stopper (51).

16 Claims, 14 Drawing Sheets

(51) Int. Cl.
  *B66D 1/52* (2006.01)
  *B63B 22/06* (2006.01)
  *B63B 22/18* (2006.01)
  *B66D 1/48* (2006.01)
  *G01C 21/12* (2006.01)
  *G01L 19/00* (2006.01)

(56) References Cited

FOREIGN PATENT DOCUMENTS

JP          3117566      12/2005
JP          2011-063159   3/2011

\* cited by examiner (a)　　　　　(b)

UNDERWATER RISING/FALLING DEVICE

CROSS REFERENCE TO RELATED APPLICATIONS

This application is the National Stage of PCT/JP2012/073139 filed on Sep. 11, 2012, which claims priority under 35 U.S.C. §119 of Japanese Application No. 2011-203274 filed on Sep. 16, 2011, the disclosures of which are incorporated by reference.

BACKGROUND OF THE INVENTION

Technical Field

The present invention relates to an underwater elevating apparatus which rises or descends an apparatus used for an observation of an environmental state of constant or non-constant water depth at specific water area in the ocean etc.

An underwater observation such as an observation of underwater temperature, pH, concentration of chlorophyll, salinity concentration, tidal streams etc. has been carried out at the ocean, lakes, rivers and barrages. In such underwater observation, it is especially important to obtain observational data at various depth, which are repeatedly observed data from a water surface to deep water at the same water area and temporally observed data in just below the water surface.

As disclosed in Patent Document 1, such underwater observation has been carried out by using an underwater elevating apparatus having buoyancy bodies wherein the buoyancy bodies mounted with an observation apparatus and a winch for spooling a cable are anchored to an anchor sunk to a bottom of water by the cable. In the case of observation in deep water depth, the buoyancy bodies are sunk by spooling the cable depending on drive of the winch while in shallow water depth, the buoyancy bodies are risen corresponding to the cable paid out by a drive of the winch. Thereby, the environmental state in non-constant water depth is repeatedly observed. Also the environmental state is temporally observed by adjusting spooling or paying out of the cable by the winch corresponding to tidal streams so that the buoyancy bodies are constantly stayed in just below the water surface.

Due to water surface waves or tidal stream variations, when the observation apparatus together with the buoyancy bodies is risen to just below the water surface or to the surface, the cable is easily loosed depending on spooling or paying out thereof by the winch. Therefore, the cable is fallen off from a drum or sheave of the winch and the underwater elevating apparatus is easily fallen into inoperative. When using a hydraulic gauge mounted to the observation apparatus, finely adjusting the depth of the observation apparatus on the basis of the depth calculated from hydraulic pressure easily causes an error of observational data. Further, if the observation apparatus is unexpectedly drifted to the water surface by ocean waves and tidal streams when it is risen to just below the water surface or to the surface, naturally arisen looseness of the cable cannot be discriminated directly.

Also, the cable which is connected to the underwater elevating apparatus and the anchor is thinned as much as possible so that the cable may be least affected by action of underwater especially tide of the open-ocean. Therefore, if the underwater elevating apparatus is surfaced in the event of large wave amplitude and the stormy oceanic condition, the underwater elevating apparatus is tossed about by heavy waves depending on swelling and large wave in water surface. Thereby the cable is excessively tensed, and the thin cable is easily broken. This increases the risk of having the expensive underwater elevating apparatus, which should be recovered, drift away. Additionally, if rising of the underwater elevating apparatus to just below water surface or to the surface is purposely avoided constantly by having the hydraulic gauge mounted to the observation apparatus, in the underwater observation, particularly in an ocean observation of vertical direction, the important observation just below water surface and on water surface cannot be carried out. In the result, purpose of the precious ocean observation is decreased by half.

Also, when electric current is not supplied to a motor of the winch while the cable being not spooled or paid out therefrom in order to give priority to the transmission efficiency of a speed reducer within the winch, the winch does not operate. Therefore, paying out of the cable is gradually and naturally arisen by self-buoyancy of the underwater elevating apparatus, and the underwater elevating apparatus is unexpectedly surfaced in course of time and faces the before-mentioned risk. Using a large speed reducer having a reverse prevention function such as warm gears decreases the transmission efficiency causing the power consumption of the motor high, and thus it is not appropriate to use such reducer for the underwater elevating apparatus which is required of an autonomous action under water by battery drive.

Further, because the underwater elevating apparatus is required of autonomous action under water corresponding to desired elevating, if paying out of the cable is not stopped before completing paying out of the cable spooled by the winch reverse paying out of the cable will start due to the excessive paying out in one direction. Therefore, exact paying out length of the cable should be counted. Although a versatile item which calculates the approximate paying out length of the cable according to number of revolutions of the winch is well known, exact paying out length of the cable cannot be calculated on the basis of only number of revolutions of the winch because the cable length per each spooling varies depending on number of turns of the cable by the winch.

Additionally, if a sacrificial electrode is provided to the underwater elevating apparatus to prevent corrosion in an underwater area, especially undersea area where a metal is easily corroded, self-buoyancy of the underwater elevating apparatus is increased depending on weight reduction of the sacrificial electrode by corrosion thereof. Thereby a load of the winch is increased, and driving force of the winch which corresponds to increment of self-buoyancy thereof is required. As the result, autonomous elevating action of the underwater elevating apparatus over the long term is prevented by increment of power consumption.

PRIOR ART DOCUMENT

[Patent Document 1] JP Patent Application Publication No. 2001-151474A

SUMMARY OF THE INVENTION

Problems to be Solved by the Invention

The present invention was made in view of solving the above described problems, and its object is to provide an underwater elevating apparatus, wherein the cable is not paid out unexpectedly by self-buoyancy while the apparatus is waiting underwater, excessive paying out of the cable may be prevented by a latch unit having simple mechanisms, and electric power is not used needlessly.

Also, other object of the present invention is to provide an underwater elevating apparatus which does not fall off from a winch due to a loose cable etc. at the time of surfacing or while waiting underwater, can detect exact cable length spooled or paid out in order to prevent excessive spooling or paying out thereof, has enough corrosion resistance, does not use extra electric power, may easily avoid surfacing at the time of storm if needed.

Means for Solving the Problems

An underwater elevating apparatus developed to achieve the objects above described is the apparatus, which rises or descends together with a flame having an underwater observation apparatus and buoyancy bodies connected through a cable anchored to the bottom, comprises: a stopper halfway attached to the cable at a lower position than the frame; a winch provided to the frame for spooling and paying out of the cable; and a latch unit provided to the frame having a plurality of openable and closable hooks surrounding the cable for causing the winch to stop spooling of the cable while causing the plurality of hooks closed to seize the stopper on the basis of a trigger according to pressure and contact with the stopper by spooling thereof and for causing the winch to start paying out of the cable from the plurality of hooks opened on the basis of the trigger by release of the stopper.

In the underwater elevating apparatus, a sheave is provided with the frame wherein the sheave is hooked on the cable extended upward the cable from the winch, tensed to the direction of the stopper and transmitted through the cable.

In the underwater elevating apparatus, link arms, which support a shaft of the sheave, is pivotally supported by the frame and biased to the opposite direction of the tension of the cable, and an approach switch which detects an approaching state of the shaft corresponding to the tension of the cable and a separating state of the shaft corresponding to looseness of the cable by a shaft marker attached to the shaft is provided with the frame.

In the underwater elevating apparatus, the approach switch is connected to a circuit for driving or stopping the winch, which causes the winch to stop paying out of the cable or to drive spooling thereof until the cable having tension when a separating state of the shaft is detected.

In the underwater elevating apparatus, an approach perceiving sensor, which detects an approach of a sheave marker provided at least at one side of the sheave, is provided with the frame, and the approach perceiving sensor is connected to a sheave revolution detection circuit which detects revolution of the sheave corresponding to frequency of an approach of the sheave marker.

In the underwater elevating apparatus, the sheave revolution detection circuit is respectively connected to a calculation circuit which calculates length of spooling or paying out of the cable corresponding to revolution of the sheave and outer circumference length thereof, an arithmetic circuit which processes comparison of the length thereof with overall length of the cable, and a winch stop circuit which stops spooling and paying out of the cable when coincidence of the length and the overall length thereof is detected by the arithmetic circuit.

In the underwater elevating apparatus, the latch unit is composed with a plunger which is locked by pressure and contact of the stopper, and the plurality of hooks which are closed corresponding to engagement with the plunger on the basis of the trigger by the plunger locked.

In the underwater elevating apparatus, the frame is provided with a stopper indication sensor which detects at least one of a stopper existence indication marker provided with the sensor which indicates existence of the stopper and a stopper seizing marker provided with the hooks which indicates the closed state of the plurality of hooks, and a winch drive circuit which carries out spooling and paying out of the cable corresponding to detection of the stopper existence indication marker and/or the stopper seizing marker is connected to the latch unit.

In the underwater elevating apparatus, the stopper is provided with a buoy and/or a sacrificial electrode.

In the underwater elevating apparatus, the cable is connected to an anchoring rope connected to an anchor, which is sunk to the bottom of water, through a separation device.

In the underwater elevating apparatus, a shaft sleeve having a same axis as a drum of the winch rotated is inserted thereinto, a circumferential groove which is inclined with respect to the axis is provided to an outer circumference of the shaft sleeve, a projection which is projected out from the drum to a direction of the axis is fitted into the circumferential groove so as to slide and travel through a guide which rotates at differential speed with the shaft sleeve by a transmission and induces reciprocation of the projection in parallel to the axis, the cable is spooled so as to pile the cable each other in synchronization with travel of the projection by revolution of the shaft sleeve on the circumferential groove while being serially inched with respect to each diameter of the cable depending on the reciprocation of the projection by the drum which is rotated in synchronization with traction of the guide.

In the underwater elevating apparatus, the frame is provided with a hydraulic gauge and a surface state detection circuit which detects a water surface state on the basis of a hydraulic pressure detected by the hydraulic gauge.

In the underwater elevating apparatus, the surface state detection circuit is configured to calculate a rising speed of the underwater observation apparatus from variation of the detected hydraulic pressure and to detect the water surface state on the basis of the rising speed.

In the underwater elevating apparatus, the surface state detection circuit is configured to calculate a dispersion value of the rising speed and to discriminate a high wave amplitude as the water surface state when the dispersion value is exceeded over a specified threshold value.

In the underwater elevating apparatus, the surface state detection circuit is configured to discriminate a high wave amplitude as the water surface state when the rising speed is minus value.

In the underwater elevating apparatus, the surface state detection circuit is configured to cause the winch to stop paying out of the cable on the basis of the detected water surface state.

Effects of the Invention

According to the underwater elevating apparatus of the present invention, even if the winch does not operate by non-supplying electric current to the motor thereof or the self-buoyancy of the underwater elevating apparatus is maintained, the cable is not unexpectedly paid out while waiting underwater. Thereby an expected occurrence as unexpected surfacing of the underwater elevating apparatus may be avoided. Such prevention of paying out of the cable is originated from simple mechanisms of the latch unit as the hooks holding the stopper. Therefore, unexpected paying out of the cable can be prevented surely, and electric power can be saved without using thereof needlessly when an underwater observation is performed for a long tem by autonomous action. This provides lightweight and simplicity to the underwater elevating apparatus.

Further, if the sheave is provided with a mechanism of detecting looseness of the cable, surfacing of the underwater elevating apparatus can be surely detected. Therefore, as soon as the cable is loosed by surfacing of the underwater elevating apparatus, paying out of the cable may be stopped or the cable may be tensed again if needed. In the result, when the underwater elevating apparatus is surfaced or waited underwater, the cable may not be fallen off from the drum of the winch or the sheave etc. by looseness thereof.

Further, unlike an underwater elevating apparatus having a configuration of detecting revolution of the drum which is varied with outer circumference length corresponding to number of turns of the cable, the underwater elevating apparatus has a simple configuration which detects length of the spooled or paid out cable according to revolution of the sheave with constant outer circumference length. Thereby length of the spooled or paid out cable may be detected and calculated exactly, precisely and reproducibly, and excessive spooling or paying out of the cable may be prevented. Also, a reversing prevention mechanism is not required for a drive gearing of the motor of the winch, and efficiency of the drive gearing may be improved, and electric power may be saved.

Furthermore, in the underwater elevating apparatus, the latch unit may be acted further surely by having the stopper provided with the buoy. Also, by the stopper which is attached separately from the frame of the underwater elevating apparatus and is provided with the sacrificial electrode, corrosion of the underwater elevating apparatus may be adequately prevented and weight saving thereof may be achieved without using extra electric power. Because between the underwater elevating apparatus and the stopper may pass in electricity through the latch unit while waiting underwater, the sacrificial electrode which is attached to the stopper may be employed in order to protect the underwater elevating apparatus from corrosion.

More additionally, by statistically proceeding with dispersion of the hydraulic pressure values measured by the hydraulic gauge within the underwater elevating apparatus, the paying out of the cable is appropriately suspended at the time of storm before surfacing of the underwater elevating apparatus, and rising thereof may be easily stopped. Thereby the rising of the underwater elevating apparatus to the surface in dangerous condition at the time of storm may be avoided safely, preclusively and easily. A wireless data transmission of observation results using radio wave had been conventionally difficult because radio wave is attenuated underwater. However, according to the underwater elevating apparatus, the wireless data transmission may be made in the lump at the time of surfacing of the underwater elevating apparatus. If needed, by separating the cable connected to the main body of the underwater elevating apparatus from an anchoring rope connected to the anchor sunk to the bottom of water by using the separation device, the underwater observation apparatus and a data logger etc. may be recovered together with the frame and reused.

Further, the underwater elevating apparatus is simple and miniaturized because a mechanism of spooling the cable tidily is integrally put into a cavity of the drum of the winch. In such case, because the underwater elevating apparatus is reduced in weight and has narrow fluid resistance area, fluid resistance thereof is decreased when used underwater and electric power energy to spool the cable is saved. Especially, power consumption to drive the winch underwater by electric power from the battery can be saved, and in the result the underwater elevating apparatus may be used repeatedly by using a small battery over a long period of term.

Furthermore, for the underwater elevating apparatus, it is not necessary to use precise parts which require highly advanced adjusting technology to prepare thereof and also number and size of the parts may be reduced. Thereby the underwater elevating apparatus may be produced simply, efficiently and inexpensively. Also, the underwater elevating apparatus has general versatility by simple structure and less incidence damage. The underwater elevating apparatus has no malfunction and may be used stably for the long time under water. According to the underwater elevating apparatus, observational data which are observed repeatedly and temporally at non-constant water depth may be obtained over the long term.

MODE FOR CARRYING OUT THE INVENTION

Hereunder, embodiments to practice the present invention in detail will be explained, but the scope of the present invention is not restricted by these embodiments.

Figure 1:
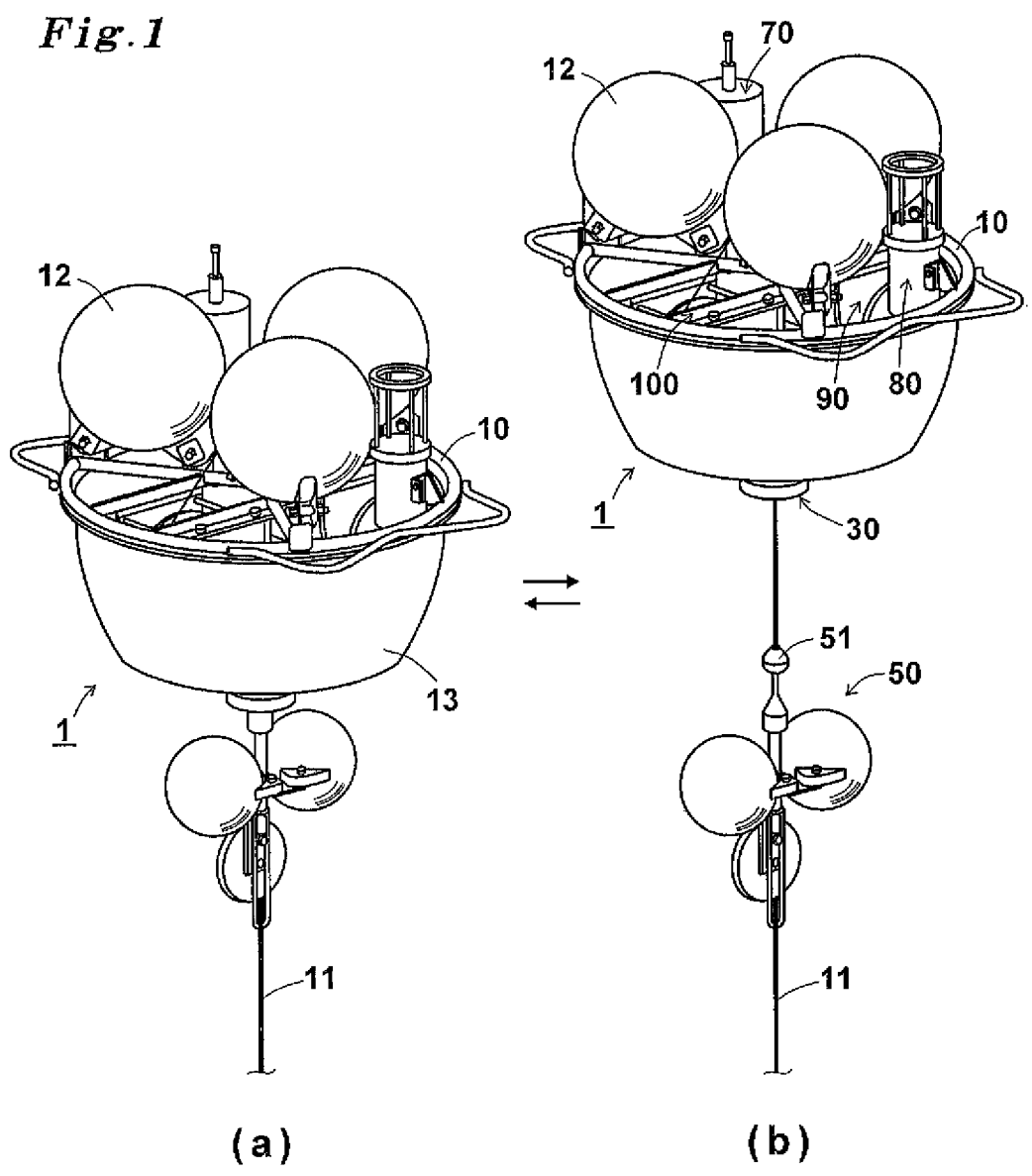
FIG. 1 is a perspective view showing a state in which the underwater elevating apparatus of the present invention is used.
Figure 2:
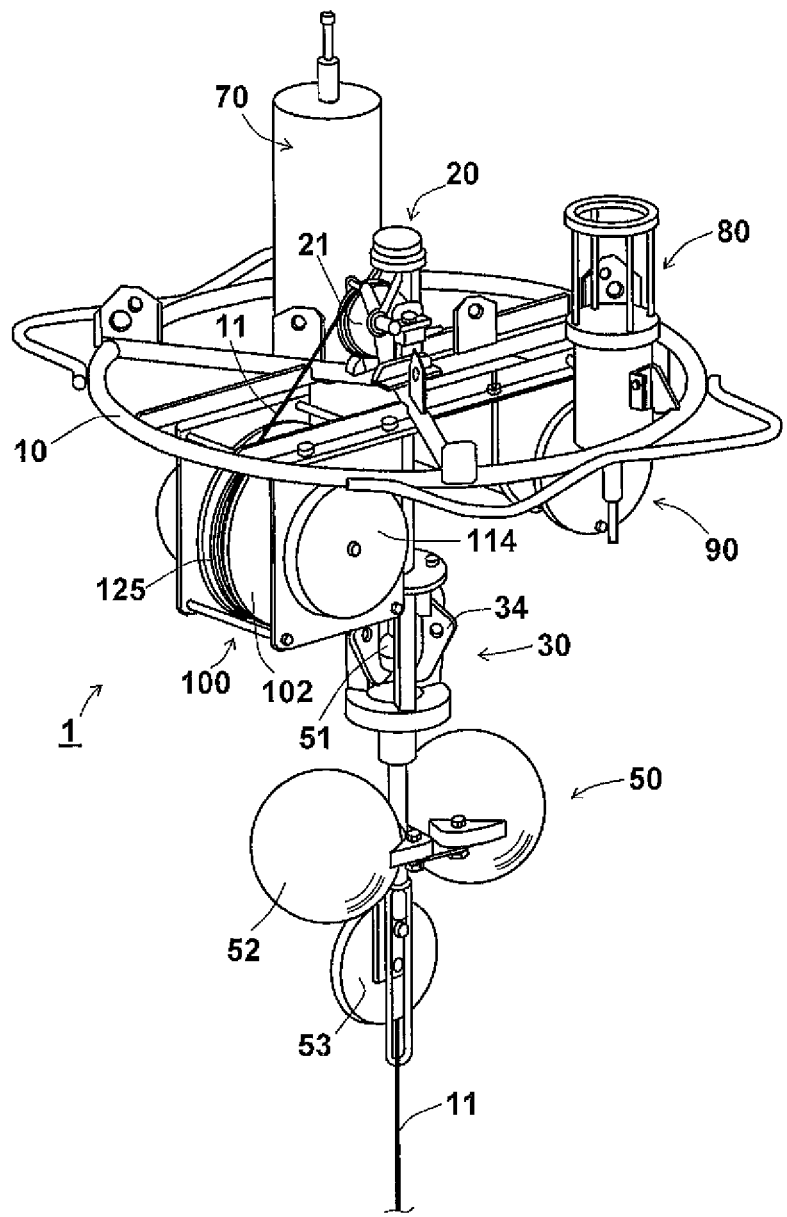
FIG. 2 is a perspective view showing a state in which the underwater elevating apparatus of the present invention is used and partially presented.

FIG. 1 shows a using state of an underwater elevating apparatus 1 of the present invention, and FIG. 2 shows an inner state of the underwater elevating apparatus 1 without a case 13. An embodiment of the underwater elevating apparatus of the present invention is illustrated by referring to these Figs.

The underwater elevating apparatus 1 is provided with a winch 102 which can spool or pay out a cable 11 so that the underwater elevating apparatus 1 may be risen or descended by autonomous action. A frame 10 of the underwater elevating apparatus 1 is provided with a winch unit 100 having the winch 102, a sheave unit 20 having a sheave 21, a latch unit 30 having a plurality of hooks 34, a control unit 70 having various circuits, a battery unit 90 having a small power source, an underwater observation apparatus 80, buoyancy bodies 12 and the case 13.

Figure 13:
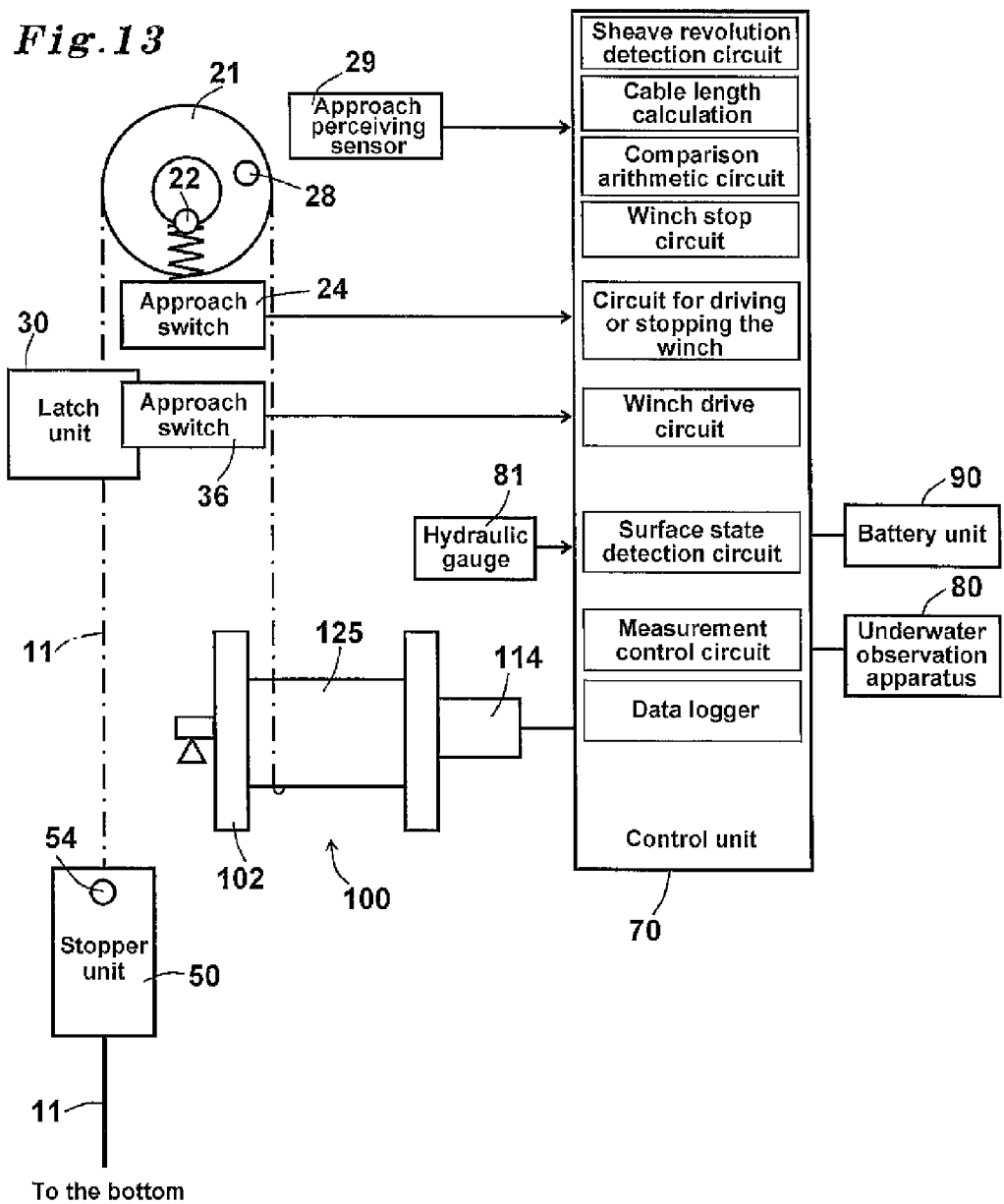
FIG. 13 is a brock diagram showing the underwater elevating apparatus of the present invention.

The control unit 70 which controls overall action of the underwater elevating apparatus 1 is integrated with a circuit for driving or stopping the winch (the circuit for a first winch), a winch drive circuit (the circuit for a second winch), a winch stop circuit (the circuit for a third winch), a sheave revolution detection circuit, a cable length calculation circuit, a comparison arithmetic circuit, a surface state detection circuit, a measurement control circuit and a data logger (see FIG. 13). As one example, the control unit 70 is provided with CPU (Central Processing Unit), a memory in which a program for action of the underwater elevating apparatus and data etc. are stored, and various interfaces. Thereby the control unit 70 is configured so as to function as each circuit.

The underwater observation apparatus 80 is provided with various observation devices such as a water temperature gauge, a hydraulic gauge, a pH meter etc. having waterproofness in a hermetically state.

The winch unit 100 having a drum 125 of the winch 102 and a motor 114 to drive a drum shaft thereof is fixed to the frame 10. The cable 11 is spooled onto the drum 125 of the winch 102. One end of the cable 11 is connected to the drum 125 of the winch 102 so as not to fall off therefrom. The other end of the cable 11 is gone through the sheave unit 20 and the latch unit 30, penetrated to lower direction, and directed to the bottom. A stopper unit 50 is attached halfway to the cable 11. The stopper unit 50 is provided at least at the stopper 51. Additionally the stopper unit 50 is preferably provided with a buoy 52 and/or a sacrificial electrode 53. These are firmly fastened to the cable 11 so as not to fall off and misalign therefrom. The stopper 51 is connected to the sacrificial electrode 53 so as to pass in electricity to therebetween.

Figure 14:
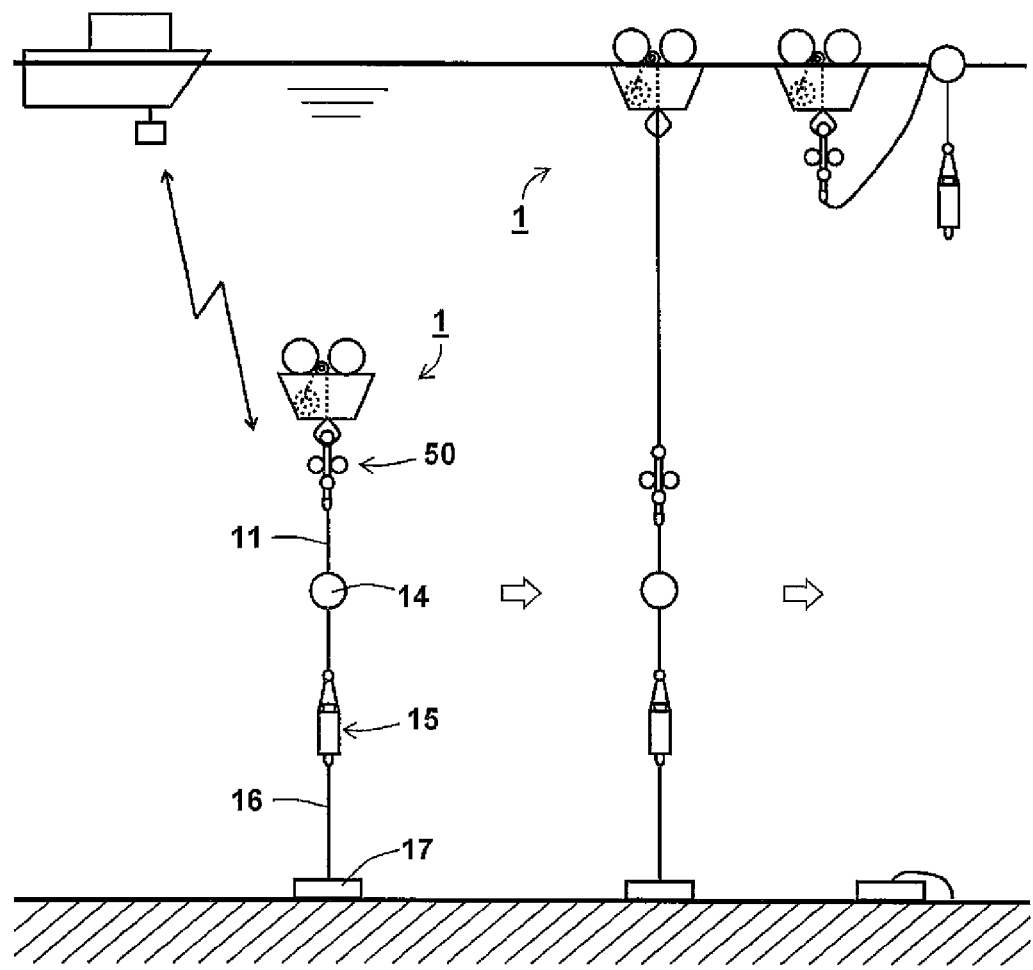
FIG. 14 is a schematic view showing a stage while in use of the underwater elevating apparatus of the present invention.

The other end of the cable 11 is connected to an anchoring rope 16 which is connected to an anchor 17 sunk to the bottom through a separation device 15 (see FIG. 14).

Figure 3:
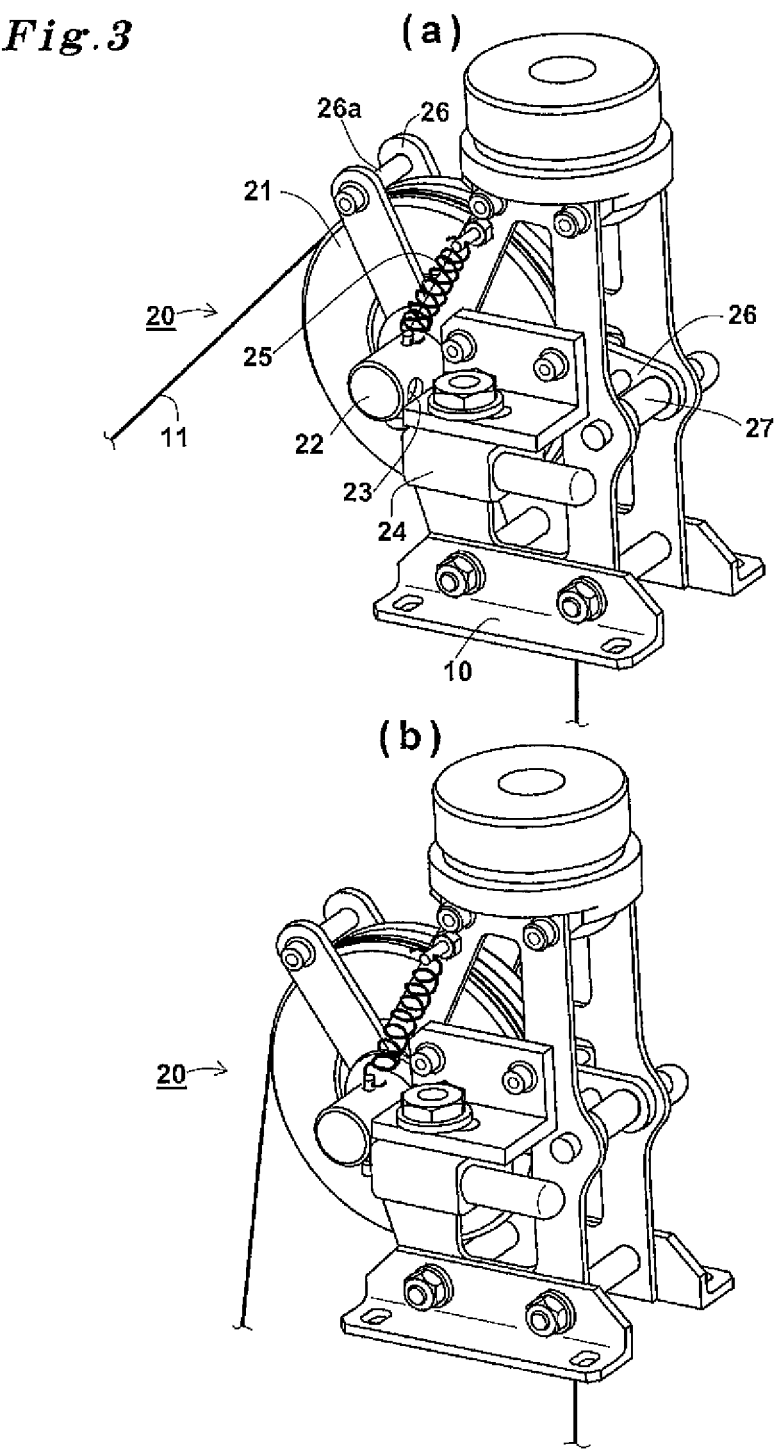
FIG. 3 is a perspective view showing a state in which the sheave unit located internally in the underwater elevating apparatus of the present invention is acted.
Figure 4:
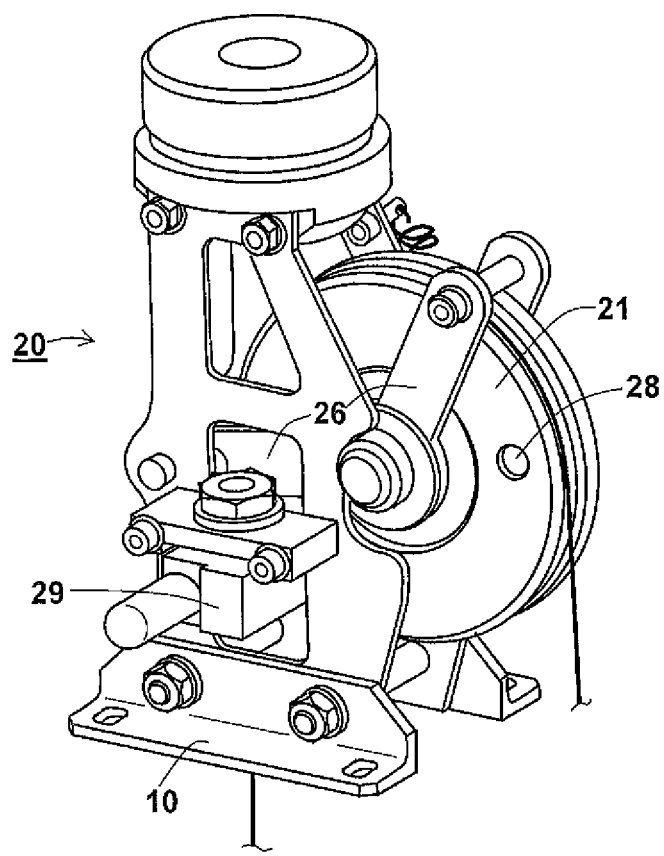
FIG. 4 is a perspective view showing a case of another state in which the sheave unit located internally in the underwater elevating apparatus of the present invention is acted.

The sheave unit 20 is individually shown in FIGS. 3 and 4. The sheave unit 20 is provided with the sheave 21 as a disc shaped pulley having a shaft 22 in the center and having a cable groove at outer circumference, and two link arms 26 to support the shaft 22 from both side of the sheave 21. The link arms 26 are pivotally supported by a support shaft 27 and are attached to the frame 10. The cable 11 upward extended from the winch 102 of the winch unit 100 (see FIG. 2) is downward curved to direction of the stopper unit 50 by the sheave 21 (see FIGS. 1 and 2), hooked up thereto, tensed and directed to the latch unit 30 (see FIGS. 1 and 2). When the cable 11 is spooled or paid out by revolution of the drum 125 of the winch 102, the sheave 21 is rotated round an axis as the shaft 22. Connection between two link arms 26 is composed by a connector 26a so as to straddle the sheave 21 for preventing falling off the cable 11 from the sheave 21.

The link arms 26 which support the shaft 22 of the sheave 21 is pivotally supported by the support shaft 27, biased to an opposite direction of tension of the cable tension, namely, upper direction, and pulled thereto by a spring 25. The state of cable 11 which is loosed by being released from tension is shown in FIG. 3(a), the tensional state of the cable 11 is shown in FIG. 3(b). A shaft marker 23 is embedded to a one end tip of the shaft 22 of the sheave 21. The shaft maker 23 is a magnet to detect the tensional state of the cable 11. The frame 10 is provided with an approach switch 24. Approach of the shaft marker 23 is detected by magnetism of the approach switch 24 with magnetic. Showing in one instance, the approach switch 24 is fixed and provided to the frame 10 at a position outer than one of the two link arms 26 so as to face at closest point to the shaft marker 23. When the cable 11 is tensed by supplying tensile force, approach of shaft marker 23 is detected by the approach switch 24. Thereby non-looseness of the cable 11 may be detected. On the other hand, when the cable 11 is loosed, the shaft 22 of the sheave 21 is distanced from the approach switch 24 by the bias of the spring 25. Thereby, because the shaft marker 23 is separated from the approach switch 24, the shaft marker 23 is not detected depending on the separating state. Therefore it may be detected that the cable 11 has looseness. The approach switch 24 is connected to a circuit for driving or stopping the winch. When the separating state of the shaft 22 of the sheave 21 is detected by the approach switch 24, the circuit for driving or stopping the winch causes the winch 102 to stop or drive spooling the cable 11 until the cable 11 having tension. The circuit for driving or stopping the winch is put into the control unit 70 in a hermetically state (see FIGS. 1, 2 and 13).

As shown in FIG. 4, in order to detect revolution of the sheave 21, a sheave marker 28 as magnet is provided to one side of the disc shaped sheave 21 by being embedded thereto. The frame 10 is provided with an approach perceiving sensor 29. Approach of the sheave marker 28 is detected by magnetism of the approach perceiving sensor 29 with magnetic. Showing in one instance, the approach perceiving sensor 29 is fixed and provided to the frame 10 at a position outer than another of the two link arms 26 so as to face at closest point to the sheave marker 28. Revolution of the sheave 21 is detected by the approach perceiving sensor 29 corresponding to approach of the sheave marker 28. The approach perceiving sensor 29 is connected to a sheave revolution detection circuit which detects revolution of the sheave 21 corresponding to number of approach of the sheave marker 28. Also, the sheave revolution detection circuit is connected to a calculation circuit (a cable length calculation circuit) which calculates spooling or paying out length of the cable 11 corresponding to revolution of the sheave 21 and outer circumference length of groove thereof. The cable length calculation circuit is connected to an arithmetic circuit (a comparison arithmetic circuit) which processes and makes a comparison between spooling or paying out length of the cable 11 and overall length thereof. The comparison arithmetic circuit is connected to a winch stop circuit, which causes the winch 102 to stop spooling or paying out of the cable 11 when coincidence of spooling or paying out length of the cable 11 and overall length thereof is detected by the comparison arithmetic circuit. The sheave revolution detection circuit, the winch stop circuit and these calculation circuits are put into the control unit 70 in a hermetically state (see FIG. 13).

Figure 5:
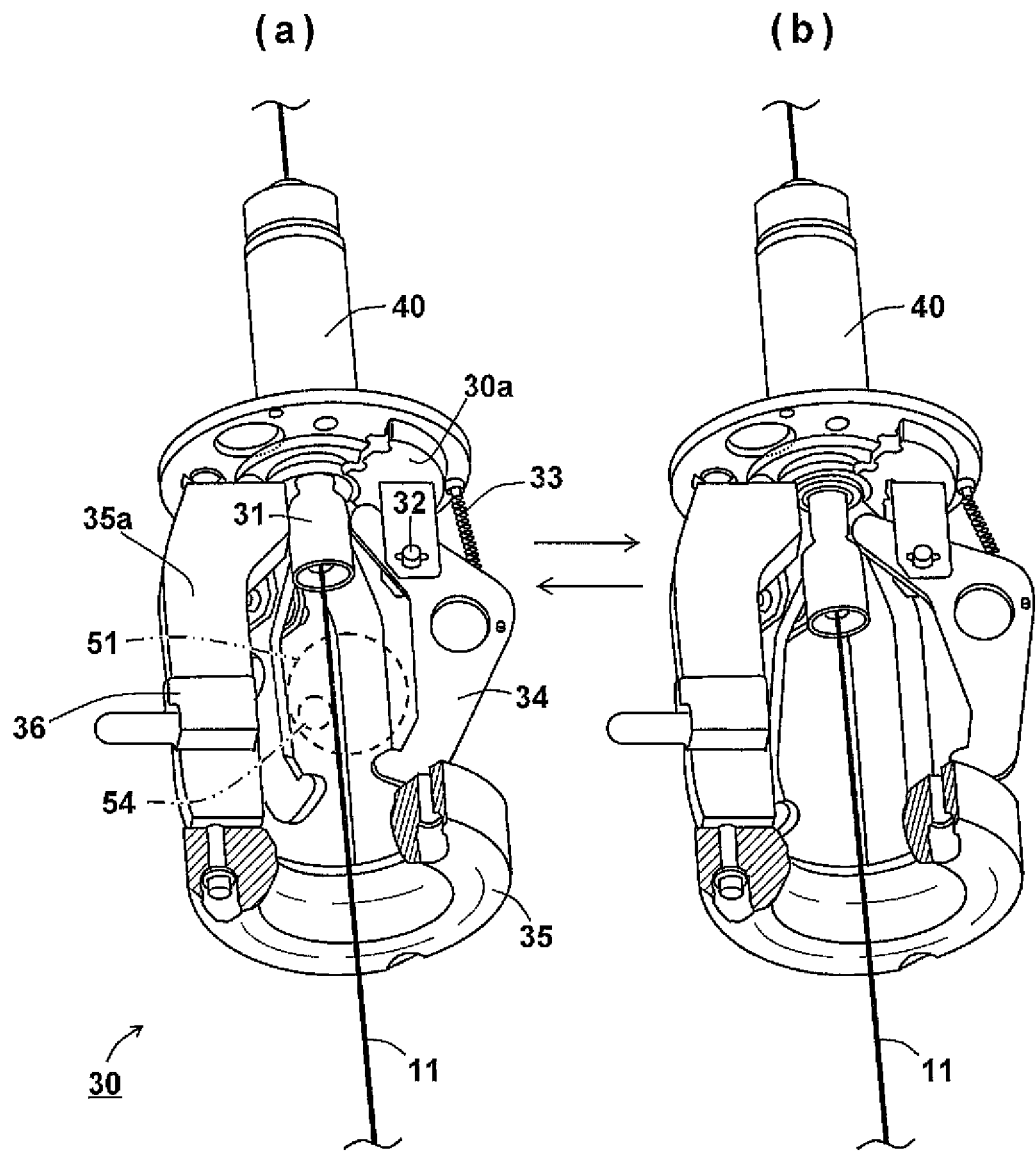
FIG. 5 is a perspective view showing a state in which the latch unit located internally in the underwater elevating apparatus of the present invention is acted.
Figure 6:
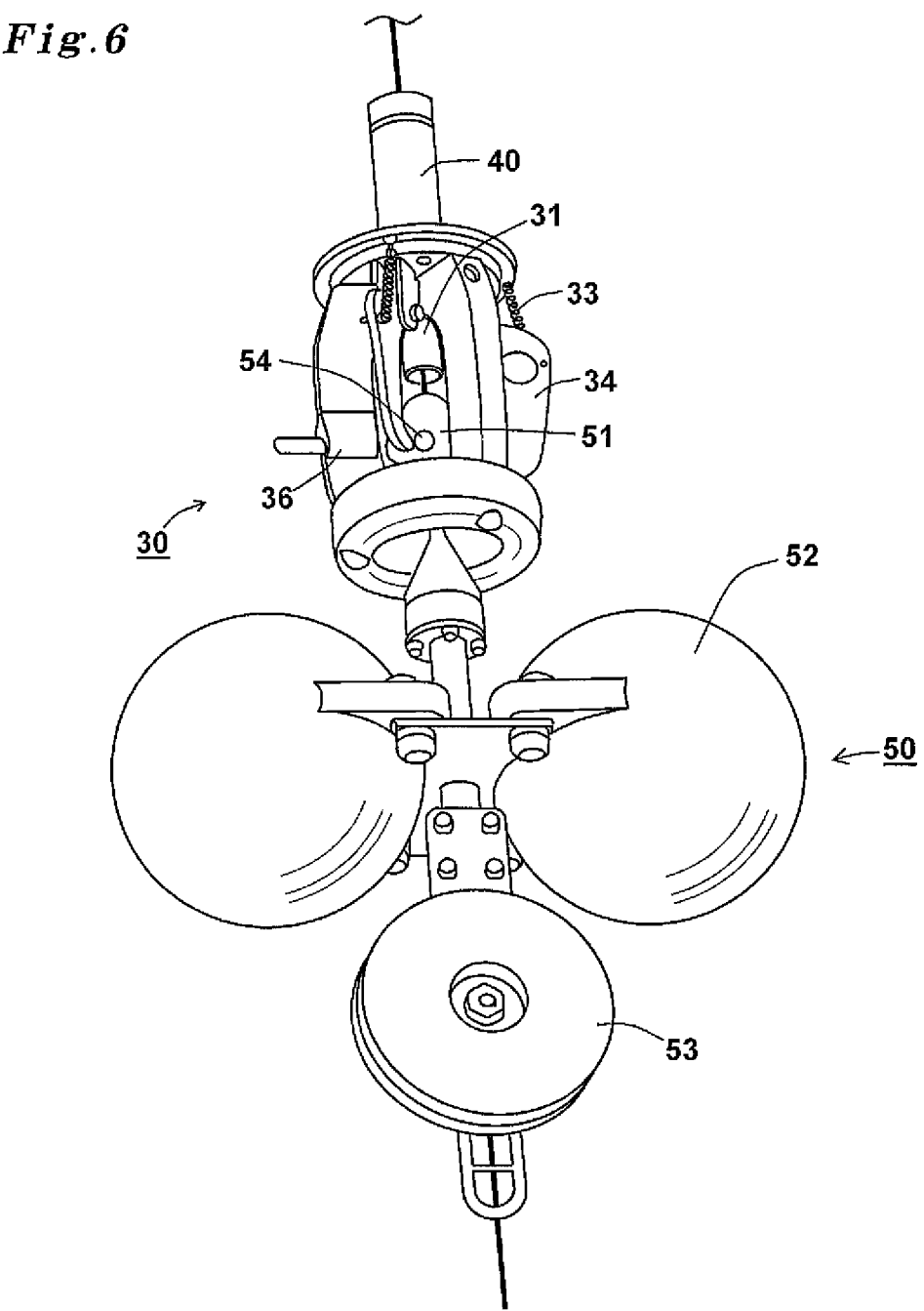
FIG. 6 is a perspective view showing a state in which the latch unit and the stopper unit located internally in the underwater elevating apparatus of the present invention is acted.

The latch unit 30 is individually shown in FIGS. 5 and 6. The latch unit 30 is provided with a base plate 30a which is fixed to the frame 10, a plunger 31 which is pierces the cable 11 with backlash, a stopper guide 35 which induces entering and leaving of the stopper 51, and the metal plate shaped hooks 34 having a cam mechanism of three dimensions. The plunger 31 has a thin diameter part having thin diameter at upside of which the cable 11 extends to the drum 125 of the winch 102, and a thick diameter part having thick diameter at down side of which the cable 11 extends to the bottom. A hole for entering and leaving the plunger 31 is formed at center of the base plate 30a. The cable 11 is surrounded by the plurality of hooks 34. The hooks 34 are pivotally supported by a support shaft 32. The support shaft 32 is attached to a strut which is downward extended from the base plate 30a. Position of the support shaft 32 is fixed relative to the base plate 30a. Each hook 34 is concavely curved each to side of the cable 11 so that the spherical stopper 51 is seized and not failed off by the cam mechanism. The hooks 34 are biased by sprigs 33 so that upper ends thereof contact with the plunger 31. Between the hooks 34 and the frame 10 may be passed in electricity. The stopper guide 35 is formed to a circular ring shape having inner diameter which may be let into the stopper 51, and fixed to the base plate 30a by pillars 35a. The stopper guide 35 is placed at a lower position than the hooks 34 (to direction of the bottom). The cable 11 is let into the hollow of the stopper guide 35. The plurality of pillars 35a (ex. three pillars) preferably support the stopper guide 35 so as to double as a guide of the stopper 51, and each pillar 35a is preferably arranged so that the stopper 51 may be seized by the hooks 34.

The plunger 31 composes a part of click-type lock unit 40. The lock unit 40 is fixed onto an upside of the base plate 30a and fixed to the frame 10. When the plunger 31 is pushed by press and contact of the stopper 51 into the lock unit 40 once, a state of which the plunger 31 is plunged thereinto is maintained by action of a lock mechanism as shown in FIG. 5(a). In such case, the upper end of each the hook 34 is pushed by the thick diameter part of the plunger 31, and pivoted round the support shaft 32 being an axis. Distance of the lower end of each hook 34 is shortened so as to seize the stopper 51, the earn mechanism becomes closed state (see FIG. 6). When the plunger 31 is pushed by press and contact of the stopper 51 into the lock unit 40 again, a state of which the plunger 31 is pushed back from the lock unit 40 is maintained by releasing the lock mechanism as shown in FIG. 5(b). In such case, the upper end of each hook 34 engaged with the thin diameter part of the plunger 31 by biasing of the springs 33, and pivoted round the support shaft 32 being an axis. Distance of the lower ends of each hook 34 is lengthened so as to release the stopper 51, the cam mechanism becomes open state.

As shown in FIG. 5, an approach switch 36 is attached and fixed to the pillars 35a of the stopper guide 35. The approach switch 36 is a sensor for stopper detection to detect a stopper existence indication marker 54 which indicates the stopper 51 by being provided thereto. A winch drive circuit which controls spooling and paying out of the cable 11 corresponding to detection of the stopper existence indication marker 54 may be connected to the latch unit 30. As one example, the stopper existence indication marker 54 is a magnet, and the approach switch 36 is a magnetic sensor which detects the magnet by magnetism. The winch drive circuit is put into the control unit in a hermetically state (see FIGS. 1 and 13).

The sensor for stopper detection to detect a stopper seizing marker which indicates the closed state of the hooks 34 may be provided to the stopper guide 35 or the pillars 35a. The winch drive circuit which operates spooling and paying out of the cable 11 corresponding to detection of the stopper seizing marker may be connected to the latch unit 30 (not shown). As one example, the stopper seizing marker is a magnet, and the sensor for stopper detection is a magnetic sensor.

Figure 7:
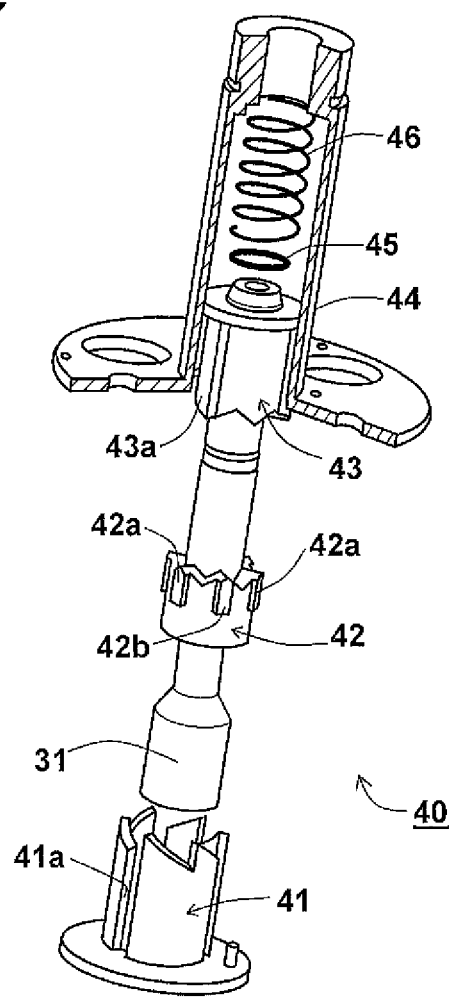
FIG. 7 is a partially cutout perspective view showing the rock unit of the latch unit located internally in the underwater elevating apparatus of the present invention
Figure 8:
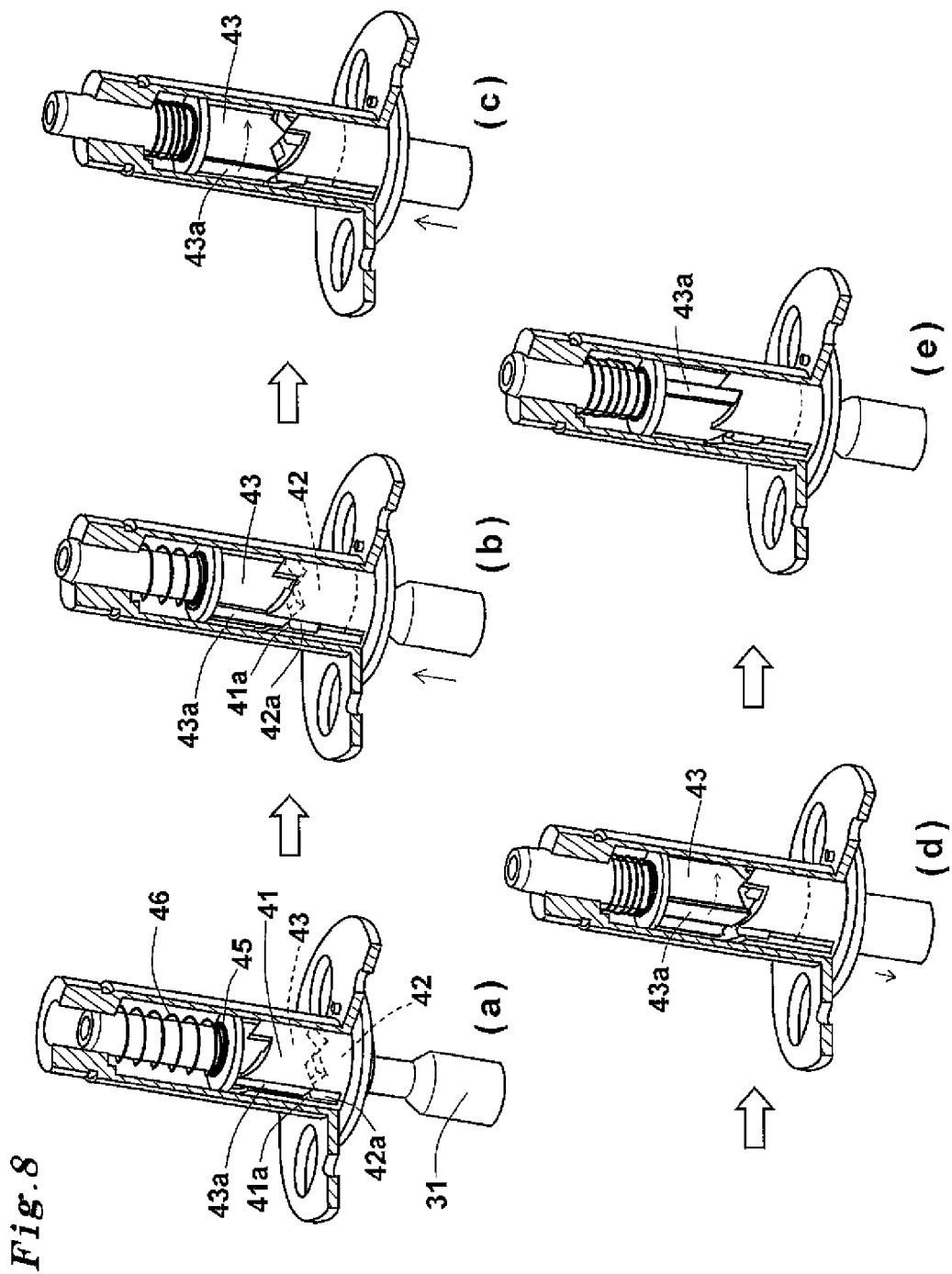
FIG. 8 is a partially cutout perspective view showing a state in which the rock unit of the latch unit located internally in the underwater elevating apparatus of the present invention is acted.
Figure 9:
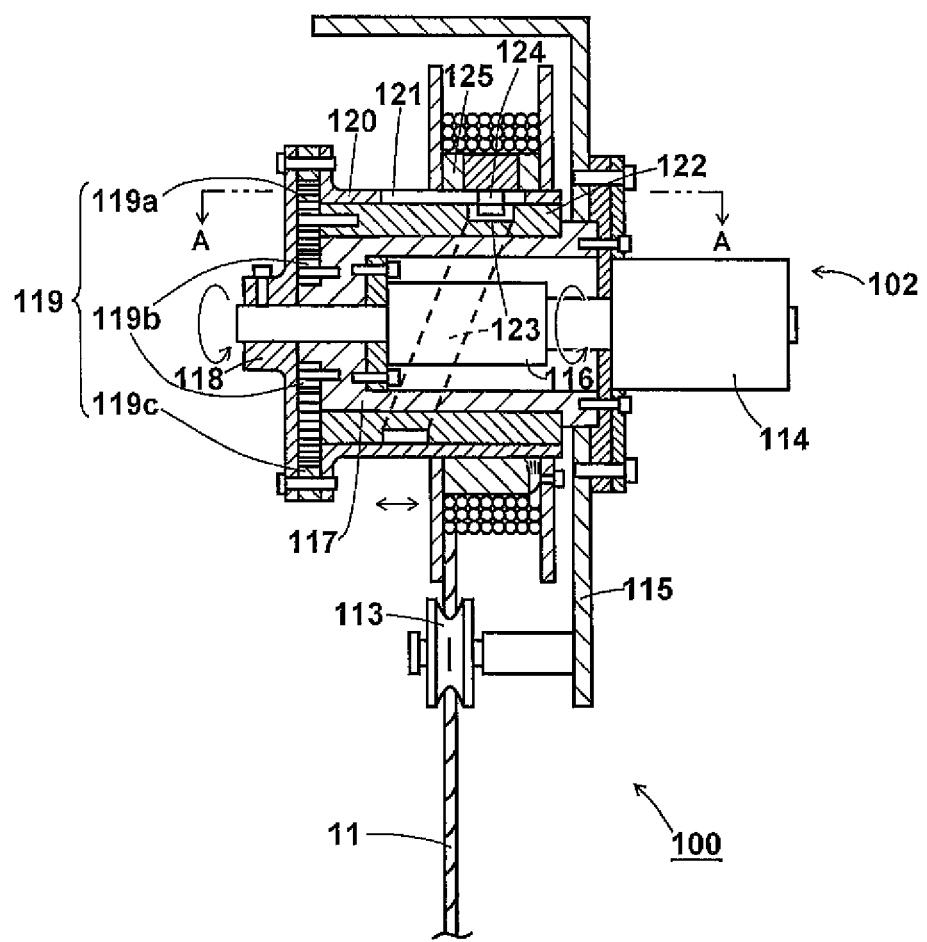
FIG. 9 is a cross-sectional view showing a state in which the winch unit located internally in the underwater elevating apparatus of the present invention is acted.

The lock unit is individually shown in FIGS. 7 and 8. As shown in FIG. 7, the lock unit 40 is composed a saw-tooth guide 41 having slits 41a which is provided onto a wall face thereof each two teeth intervals, the plunger 31 which pierces into the saw-tooth guide 41, triangulate waves shaped saw-teeth (A) 42 and saw-teeth (B) 43 to which the plunger 31 pierces, a O-ring 45, and a spring 46, all of which are inserted into hollow of a cylindrically body 44. As shown in FIGS. 7 and 8, a protruding portion 42a and a rib 43a are provided to each side wall of the saw-teeth (A) 42 and the saw-teeth (B) 43. The protruding portion 42a and the rib 43a are guided by inserting into the slit 41a of the saw-tooth guide 41. Also, a protruding portion 42b is provided to side wall of the saw-teeth (A) 42. The protruding portion 42b is guided by a groove (not shown) which is formed at inner wall of the saw-tooth guide 41. The saw-tooth guide 41 is fixed to the cylindrically body 44 with whirl-stop relative thereto. The plunger 31 does not be cored from the saw-teeth (B) 43 to which the O-ring 45 is engaged. Further not shown, a flange is formed to push the saw-teeth (A) 42 at the plunger 31. The saw-teeth (B) 43 are downward biased by the spring 46.

The lock unit 40 is locked or unlocked by carrying out as shown in FIG. 8. An initial state of the lock unit 40 is shown in FIG. 8(a). When the plunger 31 is pushed into the lock unit 40 by the stopper 51 (see FIG. 6), the saw-teeth (A) are pushed by the flange (not shown) of the plunger 31. Thereby the saw-teeth (A) 42 and the saw-teeth (B) 43 are slid inside the saw guide 41 to upper direction. In such slide, the protruding portion 42a of the saw-teeth (A) 42 and the rib 43a of the saw-teeth (B) 43 are slid by being guided the slit 41a of the saw-tooth guide 41 (see FIG. 8(b)). When the plunger 31 is additionally pushed into the saw-tooth guide 41, the rib 43a is separated from the slit 41a of the saw guide 41 by being pushed the saw-teeth (A) 42. The saw-teeth (B) 43 can be rotated about the plunger 31 (see FIG. 8(c)). A saw-tooth of the saw-teeth (A) 42 and a saw-tooth of the saw-teeth (B) 43 are mutually struck so that an angle of which the teeth (B) 43 can be rotated to direction of the dashed arrow shown in FIG. 8(c). When the saw-teeth (B) 43 are started to rotate, the rib 43a of the saw-teeth (B) 43 is slid on a saw-tooth of the saw-tooth guide 41 (see FIG. 8(d)). A lower part of the protruding portion 43a is formed an angle which is matched with the saw-tooth of the saw-tooth guide 41. When force to push the plunger 31 is removed, the spring 46 is pushed. Thereby the saw-teeth (B) 43 are additionally rotated. Rotations of the saw-teeth (B) 43 are stopped depending on the rib 43a which is struck the next saw-tooth of the saw-tooth guide 41 (see FIG. 8(e)). The saw-teeth (B) 43 are stayed in the position. It is maintained that the plunger 31 is pushed into the lock unit 40, namely, locked, because the O-ring 45 is put around the plunger 31 for not coring.

In the state shown in FIG. 8(e), when the plunger 31 is pushed into the lock unit 40, the saw-teeth (B) 43 is rotated corresponding to the rib 43a which is crossed over the next saw-tooth of the saw-tooth guide 41. The rib 43a is fittingly joined to the next slit 41a, and pushed by the spring 46. Thereby, the saw-teeth (A) 42 and the saw-teeth (B) 43 are downward slid. Therefore, the lock of the plunger 31 is released, and the thick diameter part of the plunger 31 is jumped out from the lock unit 40 (see FIG. 8(a)).

According to the lock mechanism such as a click-type ballpoint pen, the state of which the plunger 31 is retracted into the lock unit 40 when the plunger 31 is pushed (see FIG. 8(e)), the lock mechanism is released when the plunger 31 is pushed again, the state of which the plunger 31 is pushed out is maintained (see FIG. 8(a)). Incidentally, the lock structure of the plunger 31 is not restricted the above described structure. As the lock structure, other lock structure of well-known click-type ballpoint pen, a lock structure of alternate-type push-button switch and a latch mechanism of a door wherein the door is opened by pushing or the door is kept in closing state by snapping may be employed.

Further, when the latch unit 30 is coupled to the stopper 51, between the stopper 51 and the underwater elevating apparatus 1 may be passed in electricity through the hooks 34 of the latch unit 30. Therefore, if a sacrificial electrode is not attached to the underwater elevating apparatus 1, it may be protected from corrosion by a sacrificial electrode which is attached to the stopper 51 to resist corrosion.

As shown in FIGS. 9 to 12, the winch unit 100 is more preferably provided with the winch 102 which can evenly spools or pays out the cable 11. Such winch 102 has the motor 114, a cylindrical shaped sleeve shaft 122 which is connected thereto, a cylindrical shaped torque transmission cylinder 120 into which the sleeve shaft 122 is inserted, and the drum 125 which surrounds the torque transmission cylinder 120 to spool the cable 11. The drum 125 has a cylindrical shape part which has approximately a half axis length of the sleeve shaft 122 and a flange part which has diameter larder than the cylindrical shape part so as to not protrude the cable 11 from the both ends thereof. The motor 114 is fixed to a frame 115 of the winch unit 100 by being screwed. An output axis of the motor 114 is coupled to a speed reducer 116 within a shaft case 117. The shaft case 117 is fixed to the frame 115 and slidably inserted to the sleeve shaft 122.

Figure 11:
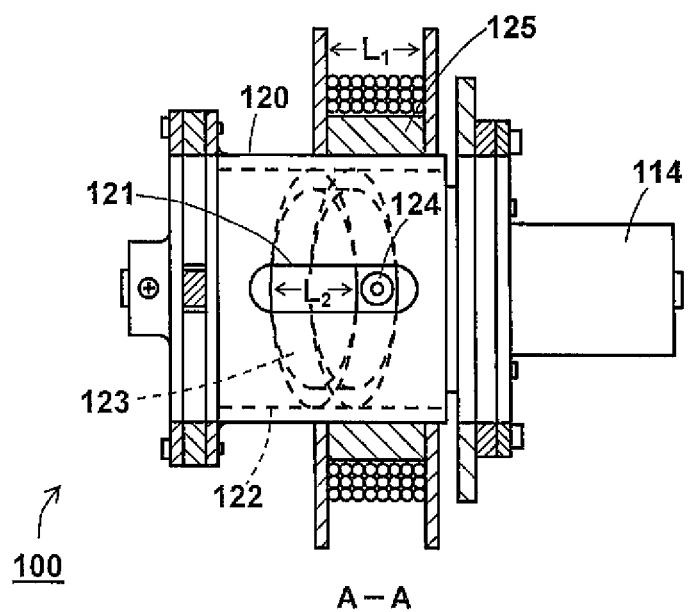
FIG. 11 is a partially cutout plan view showing a case of another state in which the winch unit located internally in the underwater elevating apparatus of the present invention is acted.
Figure 12:
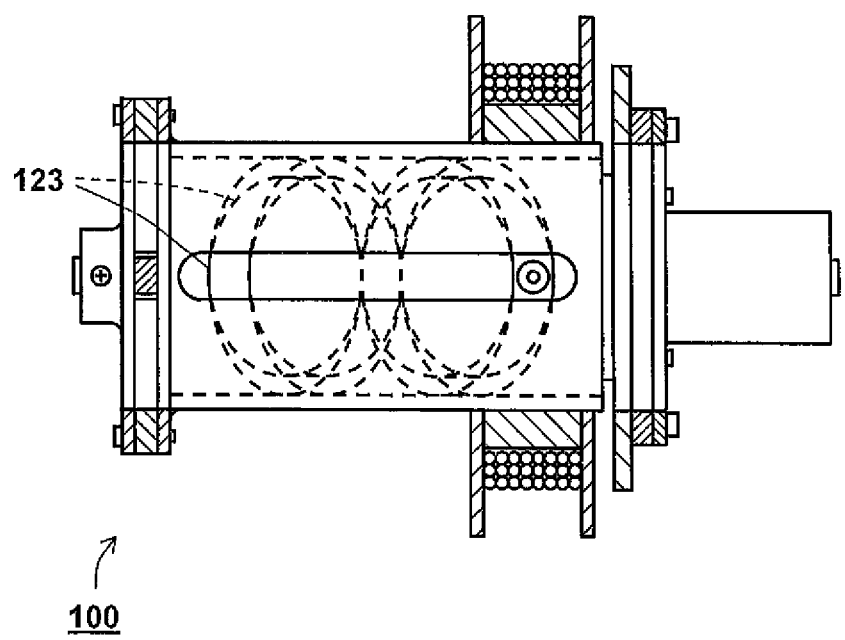
FIG. 12 is a partially cutout plan view showing a state in which another winch unit located internally in the underwater elevating apparatus of the present invention is acted.

The outer circumference of the sleeve shaft 122 is provided with a circumferential groove 123 which is inclined with respect to direction of the output axis of the motor 114 at only a width $L_2$ corresponding the axis length $L_1$ of the drum 125 (see FIG. 11). The sleeve shaft 122 is slidably inserted into the torque transmission cylinder 120. The torque transmission cylinder 120 is provided with a guide 121 which is made a slit parallel to direction of the output axis of the motor 114.

An output axis of the speed reducer 116 is screwed to an outer face side of torque flange 118. The torque flange 118 is screwed to the torque transmission cylinder 120 though an internal gear 119c at outer circumference vicinity of inner face side thereof. Planetary gears 119a which are intermeshed with the internal gear 119c are pivotally supported to the sleeve shaft 122. A sun gear 119b which is intermeshed with the planetary gears 119a is pivotally supported to the shaft case 117. A transmission 119 is composed by these gears 119a, 119b and 119c.

The torque transmission cylinder 120 is slidably inserted to the drum 125. A projection 124 is projected out from inner wall of the drum 125 toward the output axis line of the motor 114. The projection 124 is pierced to the guide 121 of the torque transmission cylinder 120, and fitted into the circumferential groove 123 of the sleeve shaft 122 so as to travel and slide. The guide 121 of the torque transmission cylinder 120 is the slit which is made in parallel to the axis (the output axis line of the motor 114). The projection 124 induces reciprocation in parallel to the axis and guides axial rotation. Length of the axis direction (the output axis line of the motor 114) of the guide 121 is longer than the inclinable width $L_2$ of the circumferential groove 123 which is inclined onto the sleeve 122 at only some backlash relative to diameter of the projection 124 (see FIG. 11).

The diameters of the planetary gears 119a are larger than the diameter of the sun gear 119b. Numbers of teeth of the planetary gears 119a are adjusted so that the projection 124 is inchmeal slid only the diameter of the cable 11 at inner of the guide 121 of the torque transmission cylinder 120 when the shaft sleeve 122 is just only once rotated.

Two rollers are stuck and pivotally supported in the projection 124. The projection 124 is easily slid and traveled in the circumferential groove 123 of the sleeve 122 by one roller, and easily slid in the guide 121 of the torque transmission cylinder 120 by the other roller.

One end of the cable 11 is screwed to the drum 125. The cable 11 is extended to lower direction of the winch 102 through a pulley 113 which is supported by the frame 115. The other end of the cable 11 is bound to the anchor 17 (the separation device 15).

The underwater elevating apparatus 1 of the present invention is used for an observation anchoring system as follows.

The underwater elevating apparatus 1 can be risen or descended underwater by having the winch unit 100. The stopper 51 and the latch unit 30 are coupled while waiting underwater. The stopper 51 is released from the latch unit 30 at the time which is preset. The cable 11 is paid out by the winch unit 100, and the underwater elevating apparatus 1 is started to rise. When the underwater elevating apparatus 1 is reached depth or cable length of the cable 11 which are preset, the underwater elevating apparatus 1 is stopped rising, and started to descend immediately or after predetermined amount of time. Logging of data which are measured by an observation apparatus is run in the control unit 70 while rising or descending of the underwater elevating apparatus 1. The stopper 51 is seized by the latch unite 30 corresponding to approach thereof at the time of descending of the underwater elevating apparatus 1. The underwater elevating apparatus 1 is waited until next action time. Various observational data which are measured at non-constant depth is integrated over the long term.

Specifically, the underwater elevating apparatus 1 is acted for the observation anchoring system as follows.

As shown in FIG. 14, the observation anchoring system is thrown into the sea so as to be coupled in order from the bottom, the anchor 17, the anchoring rope 16 which is connected thereto, the separation device 15 as an acoustic separation device which is connected to upper end of the anchoring rope 16 so as to separate therefrom, the cable 11 which is connected to the separation device 15 so as to not separate therefrom, a buoy 14 which is connected to the cable 11 halfway, the stopper unit 50 and the underwater elevating apparatus 1. The observation anchoring system is extended from the bottom to the surface. In this case, the underwater elevating apparatus 1 is anchored in deep location of underwater. The stopper 51 is seized by the cam mechanism of the hooks 34 of the latch unit 30 (see FIG. 6).

The winch drive circuit within the control unit 70 is run specified time at which the observation should be started. First, the cable 11 is slightly spooled corresponding to the drum 125 of the winch 102 which is started to drive by the motor 114. Thereby locked state of the lock unit 40 is released corresponding to the plunger 31 which is pushed by the stopper 51, and the stopper 51 may be released from the hooks 34. Next, the cable 11 is paid out by the winch drive circuit causing the motor 114 to drive. Then the underwater elevating apparatus 1 is started to rise by buoyancy of the buoyancy bodies 12 etc. which is provided thereto. In such case, the cable 11 is tensed as shown in FIG. 3(b) by the buoyancy.

Further, when the cable 11 is paid out by the circuit for driving or stopping the winch, the underwater elevating apparatus 1 is surfaced. Then the cable 11 is loosed as shown in FIG. 3(a) because the tension of the cable 11 is lost by buoyancy. Since the shaft 22 of sheave 21 is distanced from the approach switch 24 by the bias of the spring 25, the shaft marker 23 is not detected by the approach switch 24 due to the releasing state thereof. Thereby looseness of the cable 11 is detected depending on the detection. Accordingly, paying out of the cable 11 by the winch 102 is stopped. In such case, because the cable 11 may be substantially loosed, the cable 11 is spooled by driving slightly the winch 102 until restoring tensional state and just non-looseness. While the underwater elevating apparatus 1 is risen from deep location to water surface, the measurement control circuit within the control unit 70 which causes the underwater observation apparatus 80 to run specified observation at various depth. Observational data is stored to the data logger within the control unit 70.

Incidentally, as shown in FIG. 4, numbers of revolution of the sheave 21 are detected corresponding to approach of the sheave marker 28 by the approach perceiving sensor 29. Paying out length of the cable 11 corresponding to the numbers of revolution of the sheave 21 and outer circumference length of groove of the sheave 21 is processed by an arithmetic circuit of the sheave revolution detection circuit. Then the length is compared with overall length of the cable 11 by the arithmetic circuit. When coincidence of the paying out length of the cable 11 and overall length thereof is calculated, drive of the winch 102 is stopped by the winch stop circuit, because if the drum 125 of the winch 102 is more rotated to same direction, the cable 11 cannot be paid out anymore and rather the cable 11 is spooled counter thereto.

The winch drive circuit within the control unit 70 is run at specified observational reprise time. Accordingly, the drum 125 of the winch 102 is started to drive by the motor 114, and the cable 11 is spooled thereby. Then, the underwater elevating apparatus 1 is started to descend, and as shown in FIG. 3(*b*), the cable 11 is tensed by the buoyance of the buoyancy bodies 12 etc. Further, spooling of the cable 11 is maintained. When the stopper 51 is pushed into the latch unit 30, spooling of the cable 11 is stopped as follows.

When the cable 11 is spooled by the winch unit 100, the stopper 51 is passed into a hollow of the stopper guide 35. When the cable 11 is more spooled by the winch unit 100, the plunger 31 is pushed into the lock unit 40 by upper side of the stopper 51. The upper side of the stopper 51 is contacted to the plunger 31, and spooling of the cable 11 is maintained. Thereby the plunger 31 is pushed by the stopper 51. Thus, pushing of the plunger 31 by the stopper 51 is carried out. The stopper existence marker 54 as the magnet is embedded to the foreground of the stopper 51. When the plunger 31 is pushed into the position of which the lock unit 40 will be acted, the stopper existence indication marker 54 is detected by the approach switch 36. When the stopper 51 is detected corresponding to the stopper existence indication marker 54 is detected by the approach switch 36, drive of the winch 102 is stopped by the winch drive circuit. While the underwater elevating apparatus 1 is descended from water surface to deep location, the measurement control circuit within the control unit 70 causes the underwater observation apparatus 80 to run specified observation at various depth. Observational data are stored to the data logger within the control unit 70.

Further, when rising of the underwater elevating apparatus 1 is restarted, the cable 11 is spooled so that locked state of the lock unit 40 is released by action of the lock unit 40 into which the plunger 31 is inserted before paying out the cable 11. When locked state is released by the action of the lock mechanism of the lock unit 40, the stopper existence indication marker 54 is detected by the approach switch 36. Thereby the cable 11 is started to be spooled eventually. At this time, the stopper 51 is released from the latch unit 30 corresponding to the hooks 34 which are opened.

Afterward, specified observation is carried out in the same manners in repeatedly rising or descending of the underwater elevating apparatus 1.

As shown in FIG. 14, an acoustic separation device is used as the separation device 15 to recover the underwater elevating apparatus 1 together with the underwater observation apparatus 80 after the observation. Action of the acoustic separation device is operated by oscillating signals such as ultrasonic wave etc. from a deck unit which is placed onto a ship. The anchoring rope 16 is separated from the cable 11 by the separation signal. Thereby the unweighted underwater elevating apparatus 1 is surfaced, and recovered from the ship.

Incidentally, an acoustic modem may be mounted to the underwater elevating apparatus 1. The acoustic modem may be controlled for the action of the underwater elevating apparatus 1 by a deck unit, or may transmit a condition underwater by using acoustic signals for monitoring on shipboard, as well as the separation device 15 of the acoustic separation device. In this case, the acoustic separation device and the acoustic modem of the winch mounted-type underwater elevating apparatus 1 may be communicated to a single deck unit by the acoustic signals, and each acoustic signals may be communicated to dual acoustic modems.

Also, in the case of using the winch unit 100 as shown in FIGS. 9 to 12, the winch 102 is acted as follows.

The motor 114 is driven to rotate the output axis of the motor 114. The output axis of the speed reducer 116 is appropriately rotated with comparatively high speed by the speed reducer 116 with which the output axis of the motor 114 is coupled. The torque flange 118 and the torque transmission cylinder 120 which are coupled to a speed reducer 116 are synchronized and rotated. Rotating of the torque transmission cylinder 120, the projection 124 is tracked by the guide 121 which is opened thereto. Thereby the drum 125 is synchronized therewith and rotated. The cable 11 is started to be spooled to the drum 125.

Simultaneously, the internal gear 119*c*, which is sandwiched between the torque flange 118 and the torque transmission cylinder 120, is also synchronized and rotated. Then, the planetary gears 119*a* are intermeshed with the internal gear 119*c* which is rotated round the output axis of the speed reducer 116, and the sun gear 119*b* which is pivotally supported to the fixed shaft case 117 and rotated at the position. Thereby the planetary gears 119*a* are reversed from the internal gear 119*c*. Accordingly, the sleeve 122 is rotated with slightly lower speed than the torque transmission cylinder 120.

When the projection 124 is most sided with the motor 114 at the circumferential groove 123 inclined, the cable 11 is spooled to the drum 125 of nearest side at the torque flange 118.

The projection 124 fitted into the circumferential groove 123 which is inclined at the outer circumference of the sleeve 122 so as to slide and travel, and the sleeve 122 is rotated at lower speed than the torque flange 120. Therefore corresponding to the drum 125 which is rotated, the projection 124 is serially inched with respect to each diameter of the cable 11 to direction of the torque flange 118 at the time of just only one rotation of the drum 125.

Figure 10:
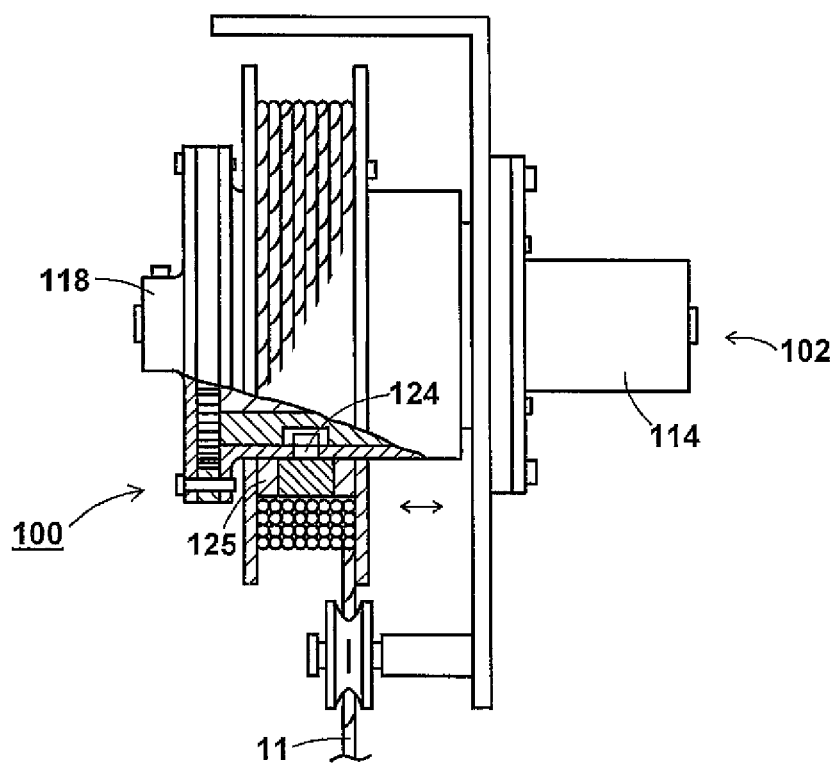
FIG. 10 is a partially cutout side view showing a case of another state in which the winch unit located internally in the underwater elevating apparatus of the present invention is acted.

Such as FIG. 10, when the drum 125 is rotated in several rotations, the projection 124 is moved to the circumferential groove 123 of the nearest side of the torque flange 118. Accordingly, the cable 11 is spooled to the drum 125 of the nearest side of the motor 114.

According to repeatedly carrying out of the above described actions, the cable 11 is orderly spooled so as to pile thereamong.

Paying out and release of the cable 11 is carried out in the same manners as the above.

Incidentally, the circumference groove 123 having ellipsoidal-shape which is orbited at the outer circumference of the sleeve 122 shown in FIG. 11 was described as the example. The circumference groove 123 may be '8'-shaped grooves once crossed and formed by a right hand helix and a left hand helix which are crossed each other and connected with each ends, or grooves having a plurality of crossed points.

The underwater elevating apparatus 1 is provided with the hydraulic gauge 81 on the flame 10. The hydraulic gauge 81 is integrated into the control unit 70 and connected to a surface state detection circuit within the control unit 70. Depth may be measured on the basis of the hydraulic pressure value detected by the hydraulic gauge 81 depending on running of the surface state detection circuit. In the event of the stormy oceanic condition, depth data (hydraulic pressure data) according to the hydraulic gauge 81 is dispersed in the vicinity of the ocean surface (see FIG. 15). The stormy oceanic condition may be detected by statistical processing of the phenomenon. In the case of the stormy oceanic condition, the underwater elevating apparatus 1 stops to rise before surfacing, and may be descended underwater.

Specifically described, it is found by the inventors of the present invention that if the hydraulic gauge is placed to a certain position from the bottom in the under ocean surface, the detection hydraulic pressure value of the hydraulic gauge is dispersed rather than being constant in the event of the oceanic condition being large wave amplitude such as storm. Further a below phenomenon is found by the inventors of the present invention. When the underwater observation apparatus is risen with constant speed (cable paying out speed) from the bottom, a rising speed thereof which is obtained by differentiating with the detection hydraulic pressure value of the hydraulic gauge provided to the underwater observation apparatus respect to the time would be approximately equaled with the cable paying out speed. But in the event of the oceanic condition being large wave amplitude such as storm, if the underwater observation apparatus is actually risen with the constant cable paying out speed, rising speed thereof is fluctuated rather than being constant. Also, a minus speed may be detected as if the underwater observation apparatus is descended, in spite of the underwater observation apparatus is occasionally risen. Such phenomenon is prominently appeared at the position of the hydraulic gauge which is approached to water surface. The phenomenon is observed at specified depth. The phenomenon is appeared at least of depth of 30 m, prominently appeared at depth of 20 m, more prominently appeared at depth of 10 m at the time of storm as the basis on water surface level location at the time of calm water surface. Appearance of such phenomenon is considered to be caused by depth from wave surface which is varied from hour to hour, because water surface is repeated swell at the time of large wave amplitude. When depth is become deep, variance of the detection hydraulic pressure is considered to be decreased because effect of wave is dispersed.

On the basis of such finding, the underwater elevating apparatus 1 is developed by the inventors. The underwater elevating apparatus 1 may detect the state of water surface, namely, high wave amplitude or low wave amplitude on the basis of the detection hydraulic pressure of the hydraulic gauge 81. Therefore when wave amplitude is high, the underwater elevating apparatus 1 may be waited underwater without surfacing to prevent damage of the cable 11 etc. The underwater elevating apparatus 1 is specifically illustrated below.

As shown in FIG. 13, the underwater elevating apparatus 1 is provided with the hydraulic gauge 81. The detection hydraulic pressure data which are detected thereby are input to the control unit 70. The surface state detection circuit which detects the state of water surface on the basis of the detection hydraulic pressure from the hydraulic gauge 81 is integrated into the control unit 70 in a hermetically state. For example, the surface state detection circuit is configured in CPU, a memory in which a program for action is stored and the like. The surface state detection circuit may be run the arithmetic process according to the program.

Figure 15:
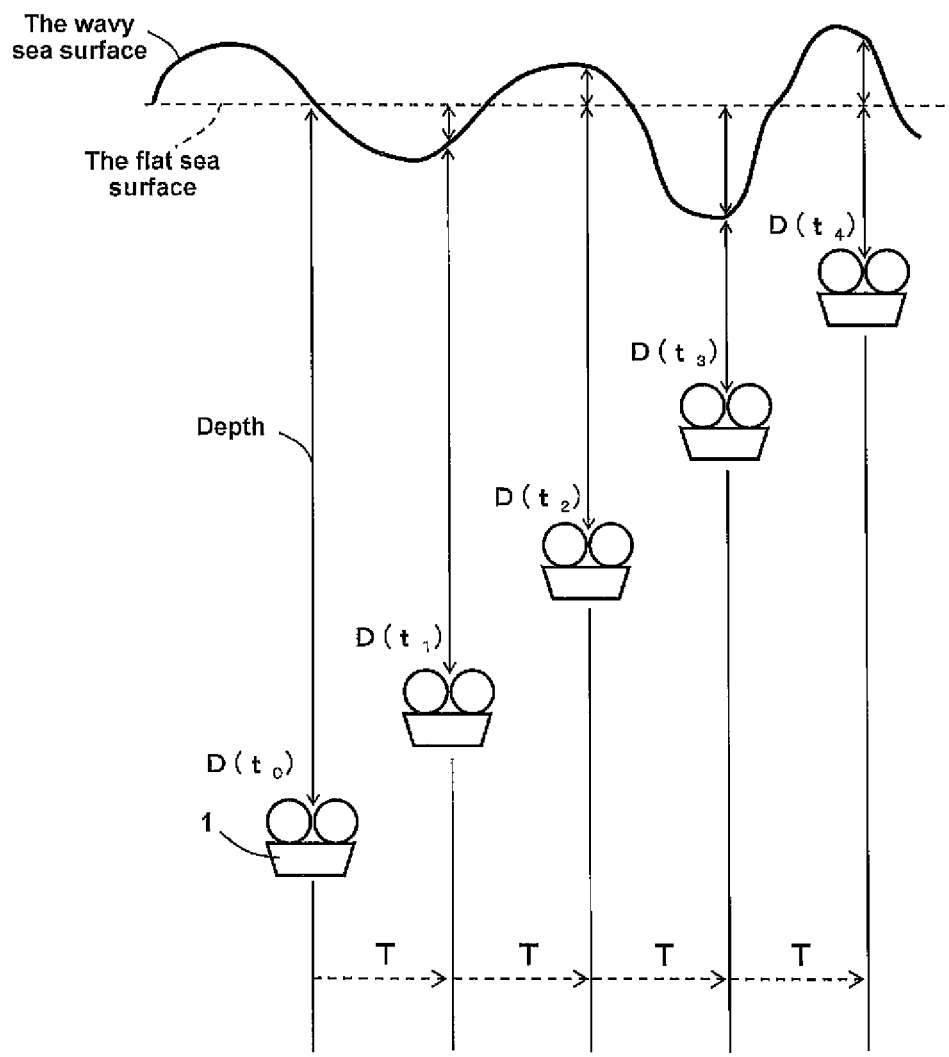
FIG. 15 is a schematic view showing another stage while in use of the underwater elevating apparatus of the present invention.

Operation of the surface state detection circuit is illustrated by FIG. 15. Incidentally, this action may be referred to as a storm detection.

A situation of the underwater elevating apparatus 1 which is risen underwater is shown in FIG. 15. The detection hydraulic pressure is input to the surface state detection circuit from the hydraulic gauge 81 at specified sampling periods T (ex. 0.1 to 5 seconds) intervals. The sampling periods T are appropriately preset corresponding to the cable paying out speed. In the case of the fast cable paying out speed, the hydraulic pressure is detected at the short sampling periods T. In the case of the fast cable paying out speed, the hydraulic pressure may be detected at the relatively long sampling periods T. As one example, the cable 11 is paid out from the winch unit 100 with the constant cable paying out speed.

A depth D is calculated by the surface state detection circuit on the basis of the detection hydraulic pressure which is input at the sampling periods T intervals, and stored to the memory. The depth D is a water depth in calm state corresponding to the detection hydraulic pressure. A situation, of which a difference between the depth from sea surface at the time of wavy sea surface and the depth therefrom at the tune of the flat sea surface is occurred, is shown in FIG. 15.

Next, rising speed of the underwater elevating apparatus 1 is calculated by the surface state detection circuit on the basis of data of the depth D and stored to the memory. Where the depth is $D(t_i)$ in the time $t_i$, the rising speed $v(t_i)$ may be calculated from below equation (1).

$$v(t_i) = \frac{D(t_i) - D(t_{i-1})}{T} \quad (1)$$

Continuously, a moving average of the rising speed is calculated by the surface state detection circuit and stored to the memory. The moving average $v_{ma}(t_i)$ of the rising speed of past N sections (N sampling values) in the time $t_i$ may be calculated from below equation (2). N includes 8, 16 or 32 as samples. For example, in the case of the sampling periods T=1 second, and N=8, the moving average of the rising speed is calculated from the 8 detection hydraulic pressure data sampled within 8 seconds.

$$v_{ma}(t_i) = \frac{1}{N} \sum_{k=i-N}^{i} v(t_k) \quad (2)$$

Continuously, the dispersion value of the rising speed is calculated by the surface state detection circuit and stored to the memory. The dispersion value $V(t_i)$ of the rising speed of passed N sections in the time $t_i$ may be calculated from below equation (3).

$$V(t_i) = \frac{1}{N} \sum_{k=i-N}^{i} (v(t_k) - v_{ma}(t_i))^2 \quad (3)$$

Here, when the dispersion value $V(t_i)$ at a certain time is exceeded the specified threshold value, it means that fluctuation of wave amplitude of the sea surface is large (wave amplitude is high). Thereby the surface state detection circuit discriminates as storm. The specified threshold value is appropriately preset on the basis of the dispersion value data which is obtained at storm.

Further, when the rising speed $v(t_i)$ is indicated at minus value in spite of the underwater elevating apparatus 1 being risen, it means that large wave amplitude is unexpectedly occurred. Thereby storm is discriminated by the surface state detection circuit.

When storm is discriminated by the surface state detection circuit, the surface state detection circuit causes the circuit for driving or stopping the winch to immediately stop paying out of the cable 11 by the winch unit 100. Therefore the underwater elevating apparatus 1 is stayed underwater without surfacing. By underwater elevating apparatus 1, specific measurement items are observed underwater at the staying depth. Alternatively, the underwater elevating apparatus 1 is descended to the stopper unit 50 after suspending observation, because the storm detection is a function which is run in order to stop surfacing of the underwater elevating apparatus 1 at the stormy oceanic condition. Therefore the storm detection is preferably run only rising time thereof.

Incidentally, the storm detection may be run on the only basis of the dispersion value of the rising speed, on the only basis of whether the rising speed indicating minus value or not, or on the basis of both combination.

Also, the storm detection may be run by calculation of standard deviation of the rising speed. But to calculate standard deviation, calculation of a square root is required. In order to decrease arithmetic load of CPU, the storm detection is preferably run by the dispersion value which is not required calculation of standard deviation. Also, the storm detection may be run on the basis of other parameter which is calculated from the detection hydraulic pressure. Moreover, when the rising speed is made variation in excess of specified value from the past rising speed sampled thereby, storm may be discriminated.

Furthermore, it may be detected whether it is in storm or not (i.e. whether wave amplitude is high or not) on the basis of coincidence of the detection hydraulic pressure (or depth) and a primary hydraulic pressure (or depth) which should be detected, a difference therebetween, a moving average of the difference, or a dispersion value thereof. In summary, when the value such as the detection hydraulic pressure value, the rising speed based thereon and the like is deviated from primary value which should be detected, storm may be discriminated. Therefore, the cable paying put speed is not restricted to constant, or may be made variation. In this case, it is calculated whether the variable cable paying out speed is deviated from primary rising speed which should be detected. Thereby the storm detection is run.

INDUSTRIAL APPLICABILITY

According to the underwater elevating apparatus of the present invention, temporally and locationally serial observational data under water may be obtained by moving the underwater observation apparatus to any water depth. Further, the underwater observation apparatus and the elevating apparatus therefor are easily recovered after completion of observation.

EXPLANATIONS OF LETTERS OR NUMERALS

Numerals mean as follows. 1: underwater elevating apparatus, 10: frame, 11: cable, 12: buoyancy bodies, 13: case, 14: buoy, 15: separation device, 16: anchoring rope, 17: anchor, 20: sheave unit, 21: sheave, 22: shaft, 23: shaft marker, 24: approach switch, 25: spring, 26: link arms, 26a: connector, 27: support shaft, 28: sheave marker, 29: approach perceiving sensor, 30: latch unit, 30a: base plate, 31: plunger, 32: support shaft, 33: springs, 34: hooks, 35: stopper guide, 35a: pillars, 36: approach switch, 40: lock unit, 41: saw-tooth guide, 41a: slit, 42: saw-teeth (A), 42a: protruding portion, 42b: protruding portion, 43: saw-teeth (B), 43a: rib, 44: cylindrical body, 45: O-ring, 46: spring, 50: stopper unit, 51: stopper, 52: buoy, 53: sacrificial electrode, 54: stopper existence indication marker, 70: control unit, 80: underwater observation apparatus, 81: hydraulic gauge, 90: battery unit, 100: winch unit, 102: winch, 113: pulley, 114: motor, 115: frame, 116: speed reducer, 117: shaft case, 118: torque flange, 119: transmission, 119a: planetary gears, 119b: sun gear, 119c: internal gear, 120: torque transmission cylinder, 121: guide, 122: shaft sleeve, 123: circumferential groove, 124: projection, 125: drum, T: sampling periods

What is claimed is:

1. An underwater elevating apparatus, which rises or descends together with a flame having an underwater observation apparatus and buoyancy bodies connected through a cable anchored to the bottom, comprising:
    a stopper halfway attached to the cable at a lower position than the frame;
    a winch provided to the frame for spooling and paying out of the cable; and
    a latch unit provided to the frame, having a plurality of openable and closable hooks surrounding the cable, for causing the winch to stop spooling of the cable while causing the plurality of hooks closed to seize the stopper on the basis of a trigger according to pressure and contact with the stopper by spooling thereof, and for causing the winch to start paying out of the cable from the plurality of hooks opened on the basis of the trigger by release of the stopper.

2. The underwater elevating apparatus according to claim 1, wherein a sheave which is hooked on the cable extended upward the cable from the winch, tensed to the direction of the stopper and transmitted through the cable is provided with the frame.

3. The underwater elevating apparatus according to claim 2, wherein link arms, which support a shaft of the sheave is pivotally supported by the frame and biased to opposite direction of tension of the cable, an approach switch which detects an approaching state of the shaft corresponding to tension of the cable and a separating state of the shaft corresponding bias by looseness of the cable by a shaft marker attached to the shaft, is provided with the frame.

4. The underwater elevating apparatus according to claim 3, wherein the approach switch is connected to a circuit for driving or stopping the winch, which causes the winch to stop paying out of the cable, or to drive spooling thereof until the cable having tension when the separating state of the shaft is detected.

5. The underwater elevating apparatus according to claim 2, wherein an approach perceiving sensor which detects an approach of a sheave marker provided one side of the sheave is provided with the frame, the approach perceiving sensor is connected to a sheave revolution detection circuit which detects revolution of the sheave corresponding to frequency of an approach of the sheave marker.

6. The underwater elevating apparatus according to claim 5, wherein the sheave revolution detection circuit is respectively connected to a calculation circuit which calculates length of spooling or paying out of the cable corresponding to revolution of the sheave and outer circumference length thereof, an arithmetic circuit which processes comparison of the length thereof with overall length of the cable and a winch stop circuit which stops spooling and paying out of the cable when coincidence of the length and the overall length thereof is detected by the arithmetic circuit.

7. The underwater elevating apparatus according to claim 1, wherein the latch unit is composed with a plunger which is locked by pressure and contact of the stopper, and the plurality of hooks which are closed corresponding to engagement with the plunger on the basis of the trigger by the plunger locked.

8. The underwater elevating apparatus according to claim 1, wherein the frame is provided with a stopper indication sensor which detects at least one of a stopper existence indication marker provided with the sensor which indicates existence of the stopper and a stopper seizing marker provided with the hooks which indicates the closed state of the plurality of hooks, a winch drive circuit which carries out spooling and paying out of the cable corresponding to detection of the stopper existence indication marker and/or the stopper seizing marker is connected to the latch unit.

9. The underwater elevating apparatus according to claim 1, wherein the stopper is provided with a buoy and/or a sacrificial electrode.

10. The underwater elevating apparatus according to claim 1, wherein the cable is connected to an anchoring rope connected to an anchor, which is sunk to the bottom, through a separation device.

11. The underwater elevating apparatus according to claim 1, wherein a shaft sleeve having a same axis as a drum of the winch rotated is inserted thereinto, a circumferential groove which is inclined with respect to the axis is provided to an outer circumference of the shaft sleeve, a projection which is projected out from the drum to a direction of the axis is fitted into the circumferential groove so as to slide and travel through a guide which rotates at differential speed with the shaft sleeve by a transmission and induces reciprocation of the projection in parallel to the axis, the cable is spooled so as to pile the cable each other in synchronization with travel of the projection by revolution of the shaft sleeve on the circumferential groove while being serially inched with respect to each diameter of the cable depending on the reciprocation of the projection by the drum which is rotated in synchronization with traction of the guide.

12. The underwater elevating apparatus according to claim 1, wherein the frame is provided with a hydraulic gauge and a surface state detection circuit which detects a water surface state on the basis of a hydraulic pressure detected by the hydraulic gauge.

13. The underwater elevating apparatus according to claim 12, wherein the surface state detection circuit is configured to calculate a rising speed of the underwater observation apparatus from variation of the detected hydraulic pressure and to detect the water surface state on the basis of the rising speed, 14. The underwater elevating apparatus according to claim 13, wherein the surface state detection circuit is configured to calculate a dispersion value of the rising speed and to discriminate a high wave amplitude as the water surface state when the dispersion value is exceeded over a specified threshold value.

15. The underwater elevating apparatus according to claim 13, wherein the surface state detection circuit is configured to discriminate a high wave amplitude as the water surface state when the rising speed is minus value.

16. The underwater elevating apparatus according to claim 12, wherein the surface state detection circuit is configured to cause the winch to stop paying out of the cable on the basis of the water surface state which is detected.

* * * * *